No. 879,423. PATENTED FEB. 18, 1908.
T. L. & T. J. STURTEVANT.
MECHANICAL FEEDER.
APPLICATION FILED OCT. 8, 1907.
2 SHEETS—SHEET 1.
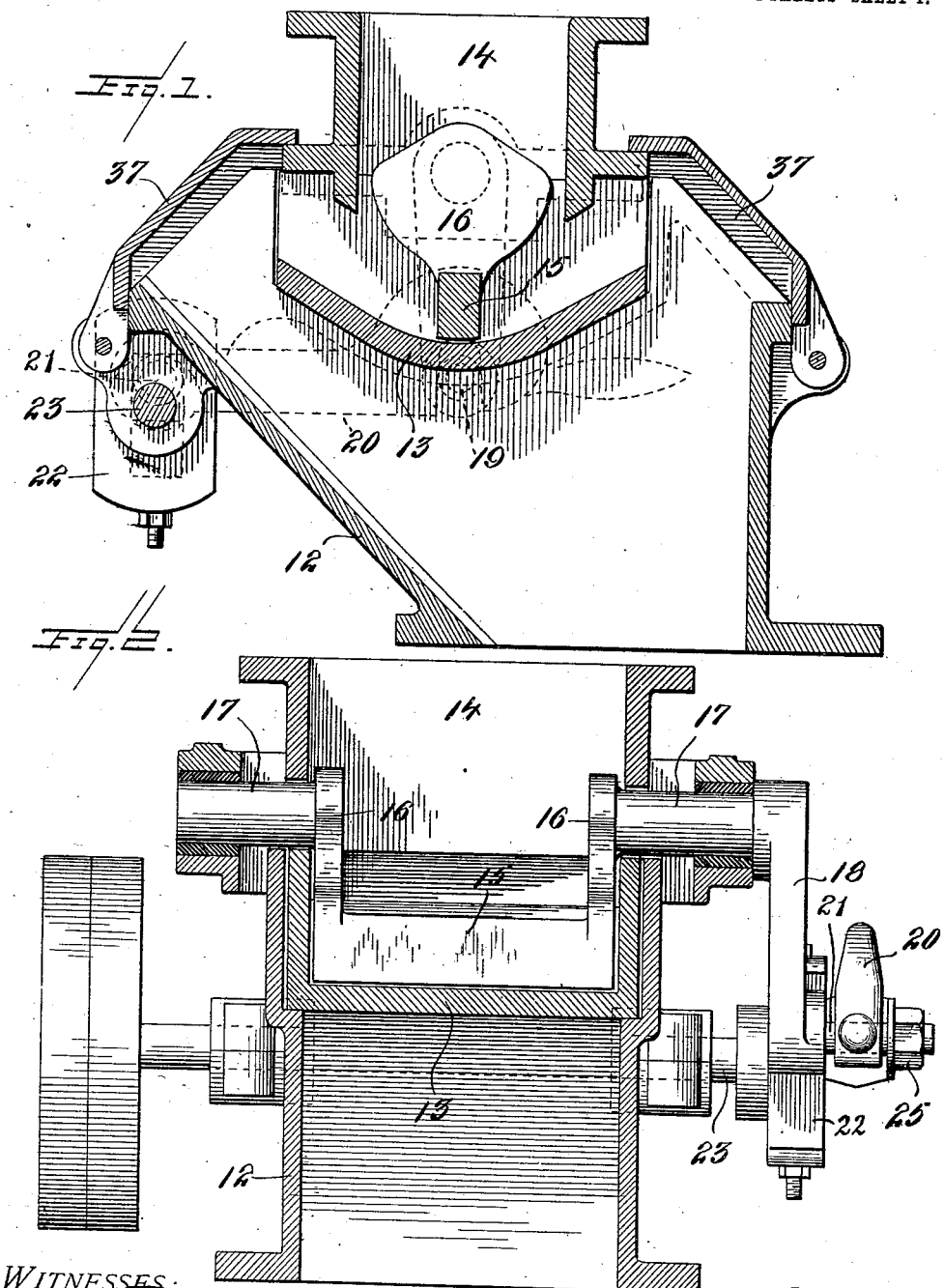

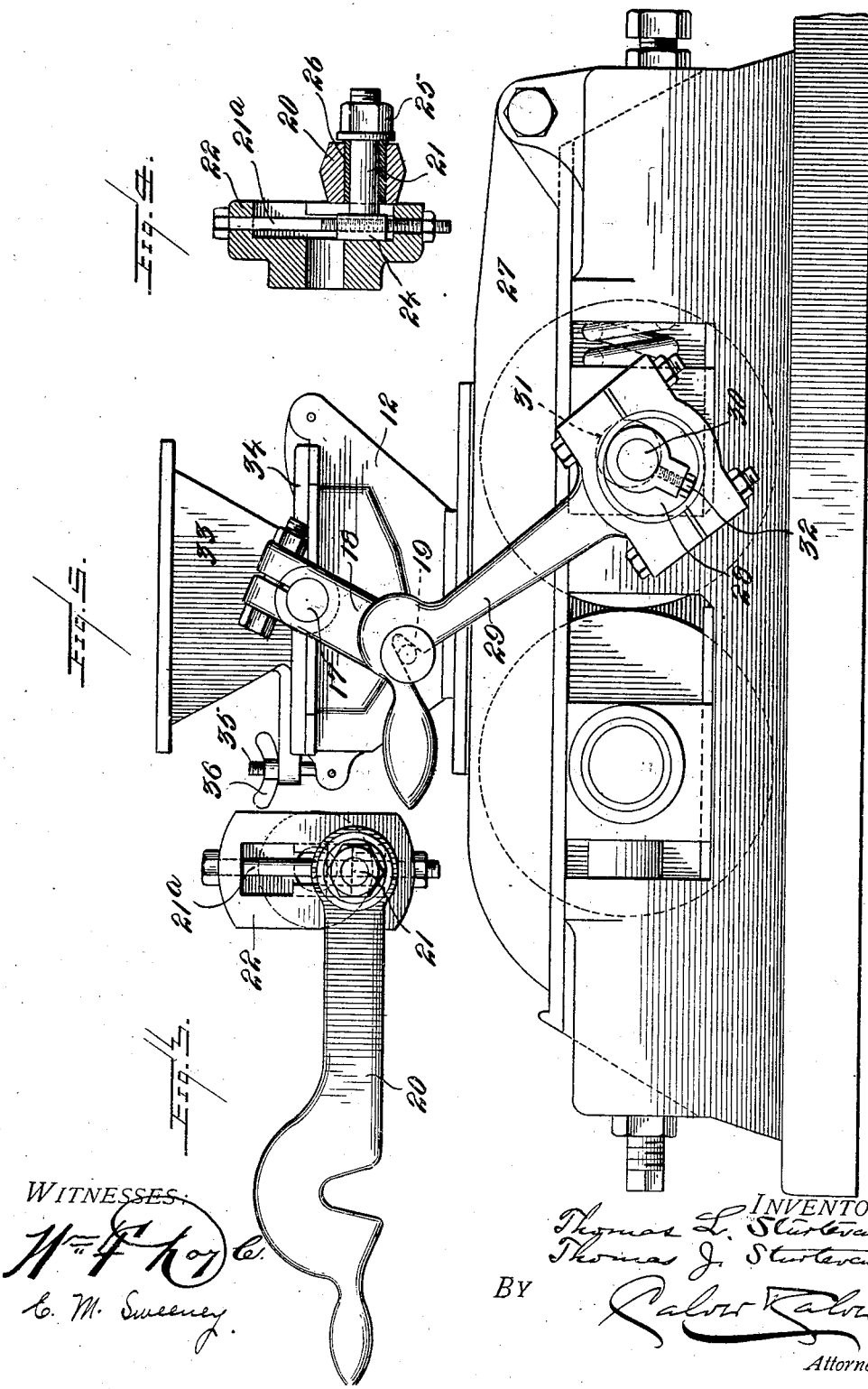

UNITED STATES PATENT OFFICE.

THOMAS LEGGETT STURTEVANT, OF QUINCY, AND THOMAS JOSEPH STURTEVANT, OF WELLESLEY, MASSACHUSETTS, ASSIGNORS TO STURTEVANT MILL COMPANY, OF PORTLAND, MAINE, A CORPORATION OF MAINE.

MECHANICAL FEEDER.

No. 879,423.　　　　Specification of Letters Patent.　　　　Patented Feb. 18, 1908.

Application filed October 8, 1907. Serial No. 396,474.

*To all whom it may concern:*

Be it known that we, THOMAS LEGGETT STURTEVANT and THOMAS JOSEPH STURTEVANT, citizens of the United States, residing, respectively, at Quincy and Wellesley, in the county of Norfolk and State of Massachusetts, have invented or discovered certain new and useful Improvements in Mechanical Feeders, of which the following is a specification, reference being had therein to the accompanying drawings.

This invention relates to a power-operated feeding device adapted to be applied to crushing or grinding mills or other machines for the purpose of feeding the material to be reduced, or otherwise operated on, thereto; the invention having for its object to provide an automatic feeder of simple construction and capable of convenient adjustment so that the amount of material fed to the mill or other machine may be accurately regulated.

In the accompanying drawings, Figures 1 and 2 are sectional views, at right angles to each other, of one form of the improved feeder. Figs. 3 and 4 are detail views to show the adjusting mechanism. Fig. 5 is a side view showing the improved feeder applied to a roll crushing mill.

Referring to the drawings, 12 denotes a suitable frame or casing adapted to be applied to a crushing mill or other machine to which the material is to be fed. Supported by the casing 12 is a stationary pan or receptacle 13 having a curved bottom and open sides, and which pan or receptacle may be supplied with material to be reduced or otherwise acted on from a magazine or hopper 14. Supported on the frame or casing 12 is a swinging or oscillating feeder comprising a cross-bar 15, arms 16 and trunnions 17, the latter being suitably journaled in bearings on the said frame or casing, and the said cross-bar 15 working in said pan or receptacle closely adjacent to the curved upper surface of the bottom thereof. One of the trunnions 17 is provided with an operating arm 18 carrying a pin 19 engaged by a hooked connecting rod 20 operated by a crank pin 21 adjustably mounted in the crank arm or disk 22 secured to a driving shaft 23 journaled in suitable bearings on the frame or casing 12. The head 24 of the crank pin 21 is engaged by an adjusting screw $21^a$ mounted in the crank arm or disk 22, so that by turning said screw the crank-pin 21 may be moved nearer to or farther from the line of the axis of the shaft 23 for the purpose of varying the throw of the feeding bar 15; said crank-pin being secured in any desired position of adjustment on the said crank arm or disk by means of a clamping nut 25 abutting against a bushing 26 interposed between the hooked connecting rod 20 and the crank-pin 21.

In the form of our invention shown in Fig. 5 the feeder is shown as being mounted on the hinged cover 27 of a well known form of roller crushing machine, and the arm 18 for the swinging or oscillating feeder is actuated from an eccentric 28 connected with one of the roll-shafts, 31, said eccentric being joined by a hooked connecting rod 29 with the pin 19 on the said arm 18. It is obvious that the hooked rod may be readily detached from the crank-arm 18 when the cover 27 is to be opened. To provide for suitable regulation of the feed in this form of the invention the eccentric 28 is mounted on a pin 30 which is eccentric to the roll shaft 31, said eccentric being secured to said pin by a set screw 32 tapped in the hub of the eccentric and engaging said pin; so that by loosening said screw said eccentric may be turned or adjusted axially on said pin to increase or diminish the throw of the connecting rod 29. By turning the eccentric in one direction the throw thereof may be made to equal the sum of the throw of the eccentric and the throw of the pin 30, and by turning the said eccentric in the opposite direction the throw of said connecting rod may be made to represent the difference between the throw of the said pin and the throw of the eccentric; and as the throw of the said pin and of said eccentric will preferably be equal it will be understood that a wide range of adjustment of the movements of the swinging feeding bar 15 will be afforded, from no throw at all to such throw as will give the feeder a large capacity.

In the form of our invention shown in Fig. 5 the hopper or magazine 33 is preferably mounted on a hinged cover 34 secured in place by a clamp bolt 35 and nut 36, and said cover may be opened, if desired, for access to the chamber of the feeder; while in the form of the invention shown in Figs. 1 and 2, access to the chamber of the feeder is afforded through openings in the feeder casing closed by hinged doors 37.

From the foregoing it will be understood that the material which may be supplied to the stationary pan or receptacle 13 will, by the vibrating or swinging movements of the feeding bar 15, be gradually pushed outward over the open sides of the said pan or receptacle, and will thus be fed to the machine on which the feeder may be mounted, the feed being regulated, as may be desired, by adjusting the throw of the swinging feeding bar.

Having thus described our invention we claim and desire to secure by Letters Patent:

1. In a feeding device, the combination with a suitable casing, of a stationary pan or receptacle having open sides, a vibrating feeding bar swinging in the said pan or receptacle, means for operating said feeding bar, and adjusting means whereby the movements of the said feeding bar may be regulated to vary the feed.

2. In a feeding device, the combination with a stationary pan or receptacle, to hold the material, and open at its sides, of a swinging or vibrating feeder working in said pan or receptacle and having an operating arm, a rotating shaft, an adjustable rotating operating device carried by said shaft, and a connecting rod communicating the movements of said operating device to said feeder.

3. The combination with a mill comprising crushing rolls, and shafts by which said rolls are carried, of a mill casing comprising a hinged cover, an eccentric rotating with one of said shafts, a feeder mounted on said cover and comprising a pan or receptacle having open sides, a swinging feeding bar and an operating arm, a hooked connecting rod for imparting movements to said arm from said eccentric and which connecting rod may be readily detached from said arm when said cover is to be lifted, and adjusting means for regulating the movements of said feeding bar.

In testimony whereof we affix our signatures, in presence of two witnesses.

THOMAS LEGGETT STURTEVANT.
THOMAS JOSEPH STURTEVANT.

Witnesses:
W. G. ELLIS,
L. H. STURTEVANT.